United States Patent
Hoshino

(10) Patent No.: US 7,720,689 B2
(45) Date of Patent: May 18, 2010

(54) AUTHENTICITY CHECKER FOR DRIVER'S LICENSE, AUTOMATED-TELLER MACHINE PROVIDED WITH THE CHECKER AND PROGRAM RECORDING MEDIUM

(75) Inventor: Satoshi Hoshino, Yamanashi (JP)

(73) Assignee: NEC Corporation, Tokyo (JP)

( * ) Notice: Subject to any disclaimer, the term of this patent is extended or adjusted under 35 U.S.C. 154(b) by 3308 days.

(21) Appl. No.: 09/899,075

(22) Filed: Jul. 6, 2001

(65) Prior Publication Data
US 2002/0046171 A1 Apr. 18, 2002

(30) Foreign Application Priority Data
Jul. 10, 2000 (JP) .............................. 2000/207927

(51) Int. Cl.
*G06Q 10/00* (2006.01)
*G06Q 40/00* (2006.01)
(52) U.S. Cl. .......................................... 705/1.1; 705/43
(58) Field of Classification Search ................... None
See application file for complete search history.

(56) References Cited

U.S. PATENT DOCUMENTS 4,296,326 A 10/1981 Haslop et al.

5,483,069 A * 1/1996 Kofune et al. ............ 250/341.8

FOREIGN PATENT DOCUMENTS

| JP | 62-130465 A | 6/1987 |
| JP | 64-67697 A | 3/1989 |
| JP | 03-78098 A | 4/1991 |
| JP | 03-127263 A | 5/1991 |
| JP | 05-314344 A | 11/1993 |
| JP | 11-66273 | 3/1999 |
| JP | 11-66273 | 3/1999 |
| WO | WO 99/30267 A1 | 6/1999 |
| WO | WO 9930267 A1 * | 6/1999 |
| WO | WO 00/28492 A1 | 5/2000 |

* cited by examiner

*Primary Examiner*—Jason M Borlinghaus
(74) *Attorney, Agent, or Firm*—Sughrue Mion, PLLC

(57) ABSTRACT

A driver's license shooting section comprises a structure that can shoot a driver's license's watermarks both from either its obverse or reverse. And a driver's license shooting controller orders the driver's license shooting section to shoot the driver's license's a watermark from its obverse. Using this result, an authenticity judging section judges the driver's license's authenticity. Then, if the driver's license is back-watermarked type, it is recognized as not authentic, when the driver's license shooting controller orders the driver's license shooting section to shoot the driver's license's a watermark from its reverse. Using this result, the authenticity judger judges if the driver's license is authentic or not. In this way, a legal back-watermarked type driver's license is judged authentic. Consequently, a driver's license's authenticity can be judged properly, no matter whether the driver's license is face-watermarked type or back-watermarked type.

2 Claims, 9 Drawing Sheets

F I G. 1
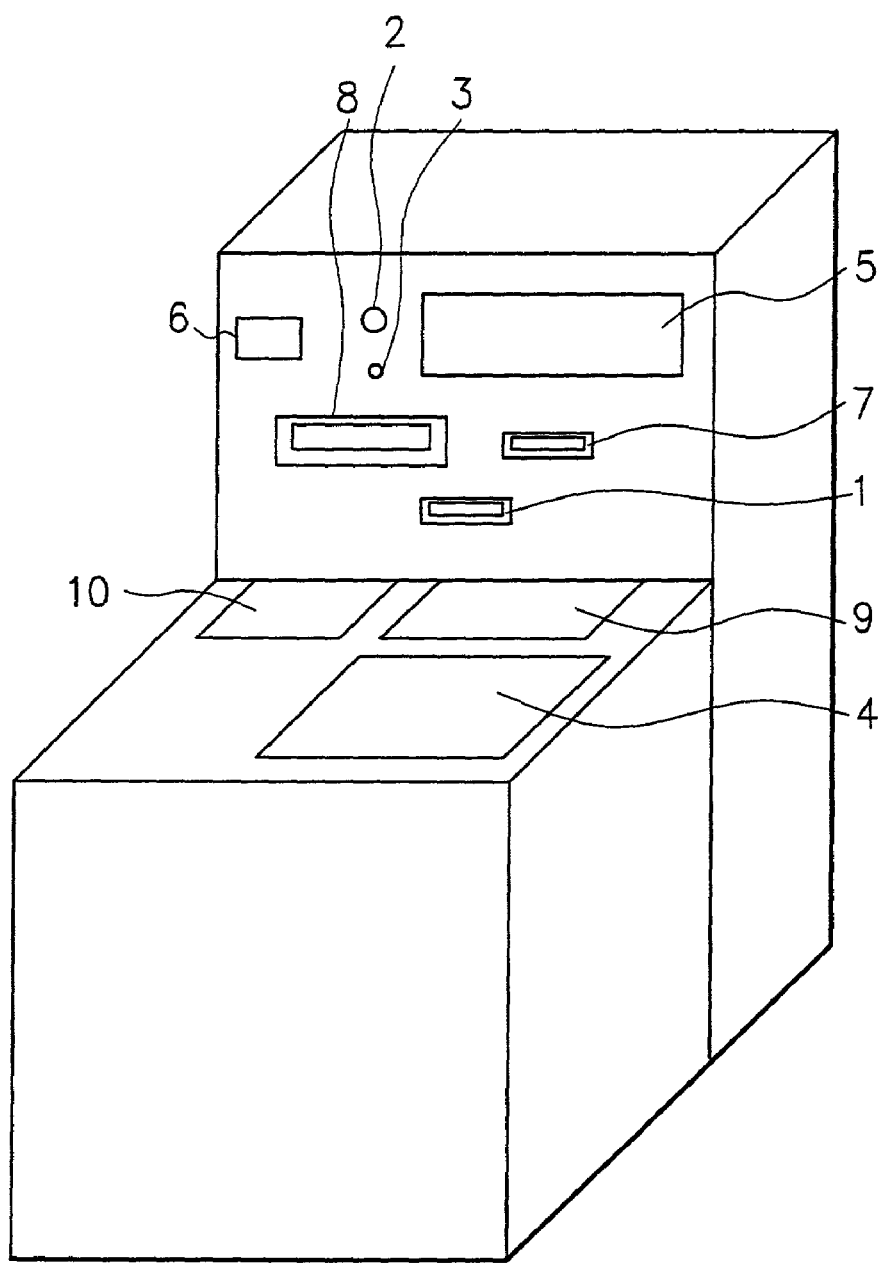

F I G. 5
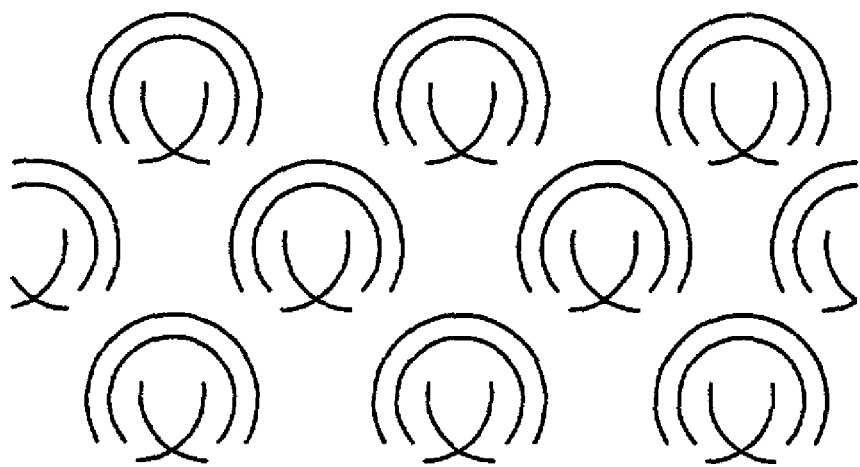

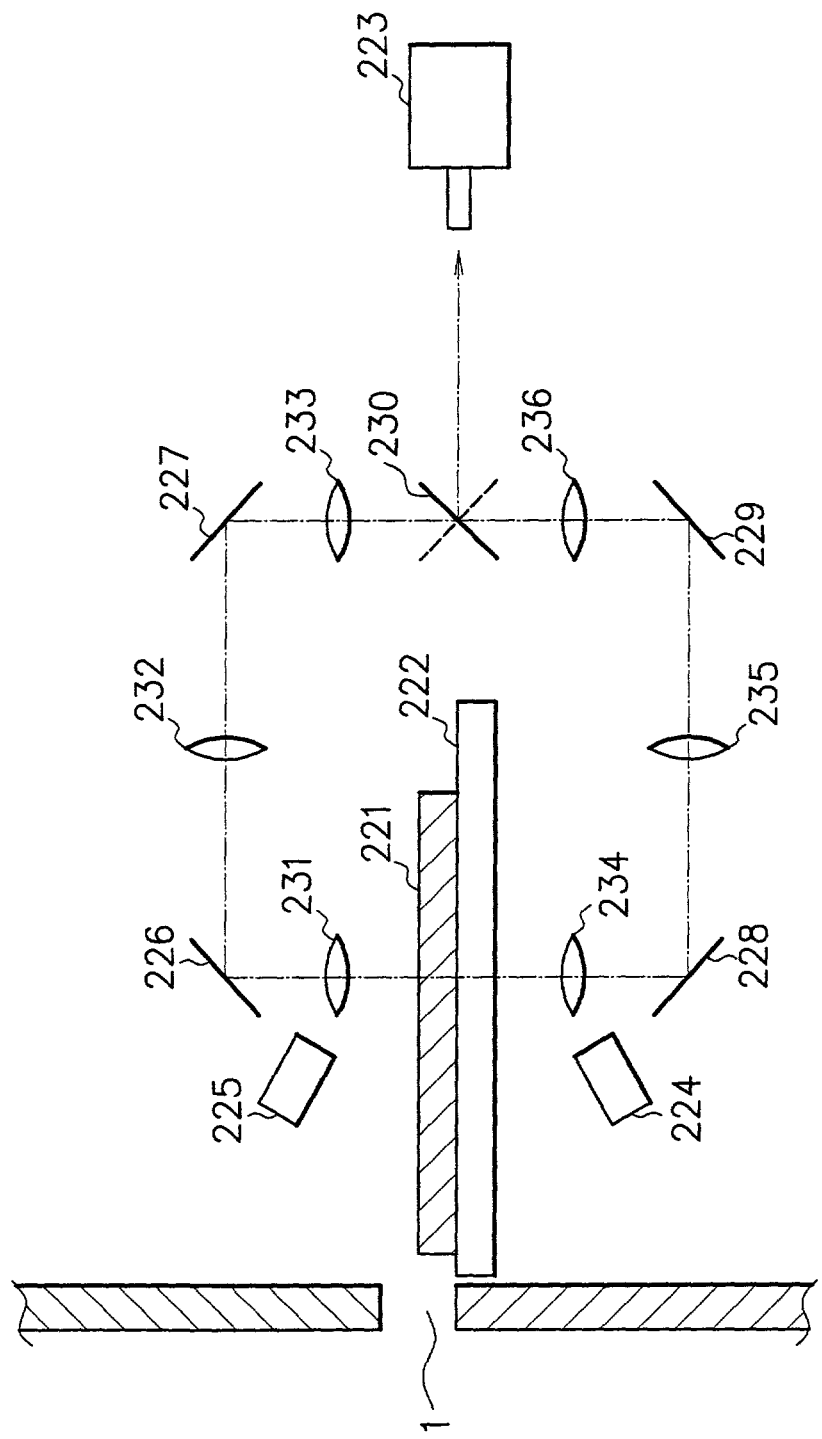

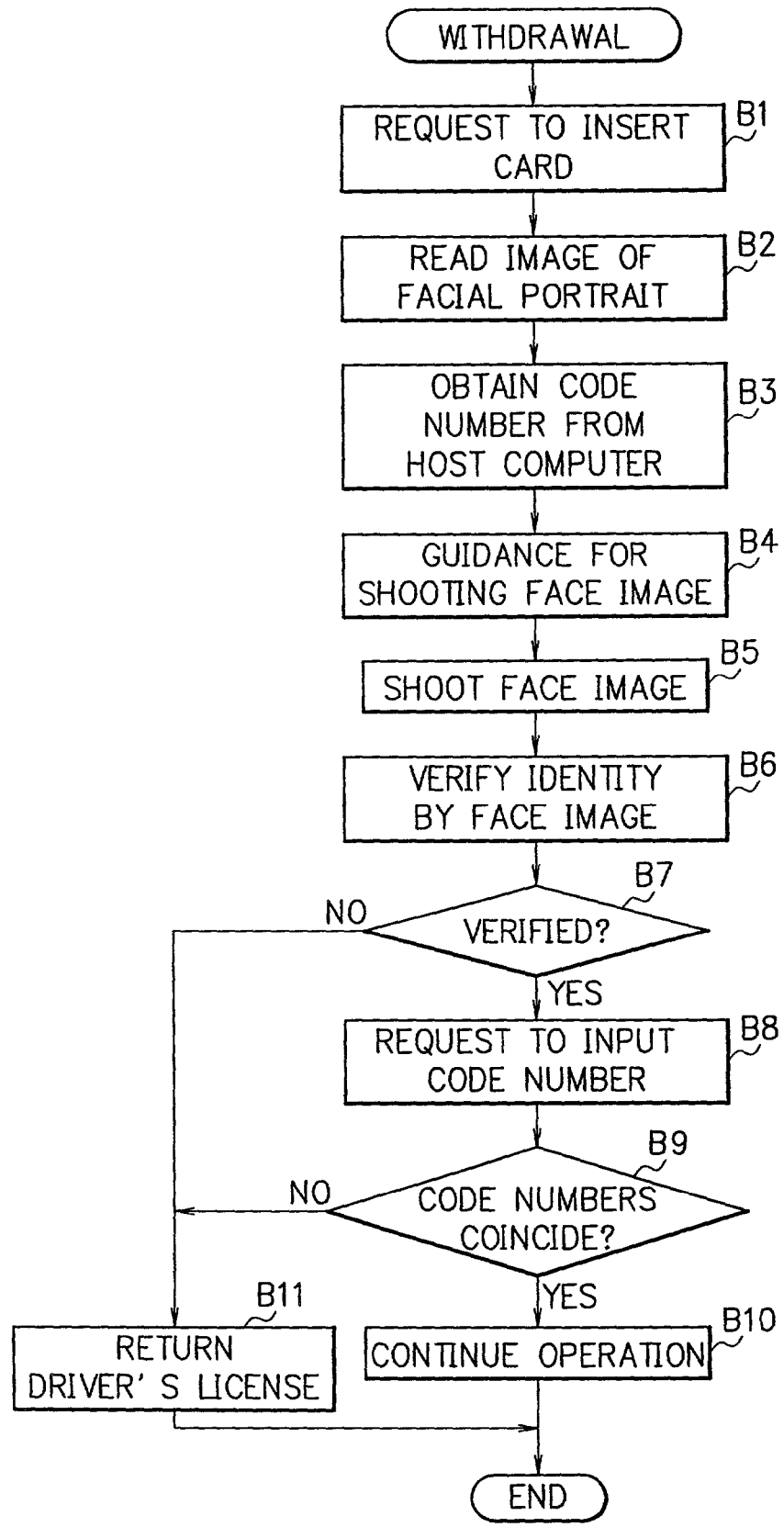

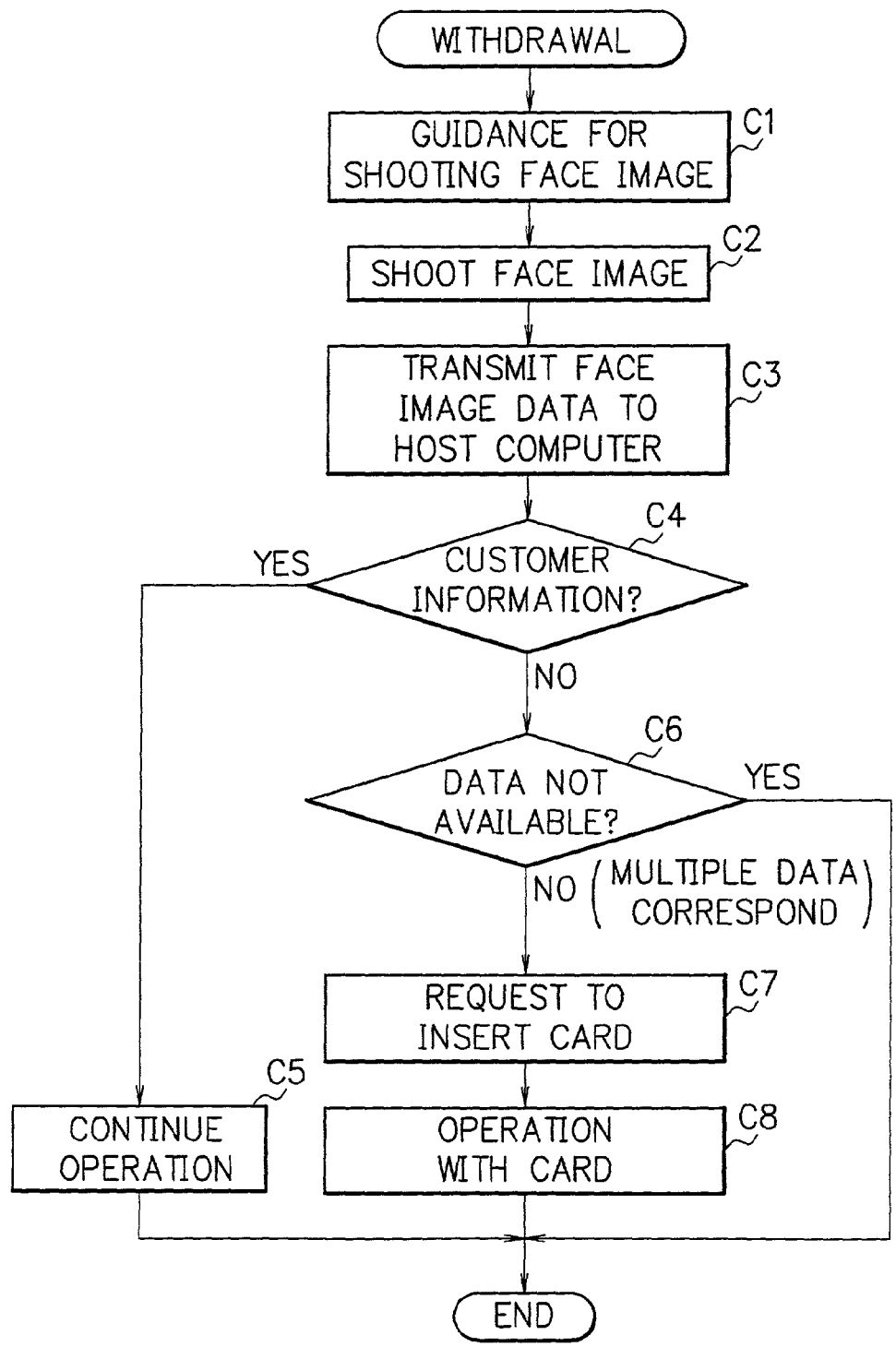

AUTHENTICITY CHECKER FOR DRIVER'S LICENSE, AUTOMATED-TELLER MACHINE PROVIDED WITH THE CHECKER AND PROGRAM RECORDING MEDIUM

BACKGROUND OF THE INVENTION

The present invention relates to an authenticity checker for a driver's license, which automatically judges the authenticity of a driver's license and an automated-teller machine provided with the checker.

DESCRIPTION OF THE RELATED ART

A driver's license is often used on the occasions where it is required to identify oneself, for example, on the occasion of opening a bank account at a financial institution. Conventionally, in such case, a teller in charge manually judges the authenticity of a license, which causes problems that his/her burden becomes heavy, and that it takes much time to judge the authenticity.

To solve the problems, devices for checking the authenticity of a driver's license using its watermark have been proposed: among them is described in the Japanese Patent Application Laid-Open No. HEI11-66273. Conventional devices of the sort judge the authenticity of a driver's license based on image data of its watermark obtained by shooting the obverse of the driver's license as irradiating the license from the backside. With those devices, it is made possible to lighten the burden of a teller and shorten the time to check the authenticity.

However, the above-mentioned devices involve a drawback as follows. The present inventor carried out an experiment on numbers of driver's licenses, in which the obverse of a driver's license was shot with the backside being irradiated, and then the backside was shot with the obverse side being irradiated by the light of the same intensity. According to the image data obtained by the experiment, it was turned out that there were two kinds of driver's licenses. One is a "face-watermarked type driver's license", whose image data obtained by shooting its obverse show a clear watermark, while the image data of the reverse side do not. The other one is a "back-watermarked type driver's license", whose image data obtained by shooting its backside show a clear watermark, but the image data of the obverse do not. Consequently, the conventional devices that judge the authenticity of a driver's license only by the image data of the obverse may judge an authentic back-watermarked type driver's license to be false by mistake.

SUMMARY OF THE INVENTION

It is therefore an object of the present invention to judge the authenticity of a driver's license automatically no matter whether it is a face-watermarked type driver's license or a back-watermarked type one.

To achieve the above object, an authenticity checker for driver's license in accordance with the present invention is provided with a driver's license shooting section being capable of shooting a watermark of a driver's license from both obverse and reverse sides, wherein in the case that neither of the watermarks is recognized as a regular one, the driver's license is judged false, while in the case that at least one of them is recognized as a regular watermark, the license is judged authentic.

According to the constitution, when the driver's license is a forgery, neither of watermarks shot from its obverse nor its backside by the driver's license shooting section is recognized to be proper, and thereby it is decided to be false. On the other hand, when the driver's license is the authentic face-watermarked type or back-watermarked type, the watermark shot from the obverse or the backside by the driver's license shooting section is recognized to be proper respectively, and in both cases, the driver's license is decided to be authentic.

More specifically, an authenticity checker for a driver's license according to the present invention comprises: a driver's license shooting section which shoots a watermark of a driver's license from either one of the obverse or reverse side according to the shooting instruction, and shoots a watermark of the driver's license from the other side according to the re-shooting instruction; an authenticity judging section which judges the driver's license authentic when the watermark shot by the driver's license shooting section is recognized as a regular watermark, and judges it false when neither of the watermarks shot from the obverse nor reverse side by the driver's license shooting section is recognized as a regular watermark; and a driver's license shooting controller which instructs the driver's license shooting section to execute shooting at the beginning of the operation for judging the authenticity, and instructs the driver's license shooting section to execute shooting again, when the watermark shot from one side is not recognized as a regular watermark.

In accordance with an aspect of the present invention, the driver's license shooting section includes, for example, the first and second cameras for shooting a driver's license from the obverse and reverse side, and the first and second lights for lighting up the driver's license from the reverse and obverse side.

In accordance with another aspect of the present invention, the driver's license shooting section includes: a camera for shooting a driver's license, a light which is placed opposite to a lens of the camera, and a revolving means for revolving the driver's license so that its backside as well as its obverse can be set to face the lens.

In accordance with a further aspect of the present invention, the driver's license shooting section includes: a camera, a conveyor means for carrying the driver's license, the first and second lights for lighting up the driver's license carried to the prescribed position by the conveyor means from the obverse and reverse side, and the first and second optical systems for supplying the camera with the light, which has transmitted through the driver's license, from the first and second lights.

In these aspects, it is enough to have only one camera for shooting a driver's license, and therefore, an authenticity checker of a driver's license can be constituted economically.

Besides, an automated-teller machine of the present invention comprises the above-mentioned authenticity checker of a driver's license and an image camera for shooting a facial portrait of a user in order to prevent unfair transaction where an identity card is used dishonestly. Image data of the facial portrait shot by the image camera is used for proving identity of the user together with an image of a photograph printed on an ID card of the user, the face image data recorded on an identification IC card of the user, or face image data of customers pre-registered in a server.

BRIEF DESCRIPTION OF THE DRAWINGS

The objects and features of the present invention will become more apparent from the consideration of the following detailed description taken in conjunction with the accompanying drawings, in which:

FIG. 1 is a perspective view showing an appearance of an ATM having an authenticity checker of a driver's license according to the present invention;

FIG. 5 is a diagram showing a watermark of a driver's license;

FIG. 7 is a diagram showing a further example of the structure of a driver's license shooting section 200;

FIG. 8 is a flow chart showing an example of operation for paying money; and

FIG. 9 is a flow chart showing another example of operation for paying money.

DESCRIPTION OF THE PREFERRED EMBODIMENTS

Figure 2:
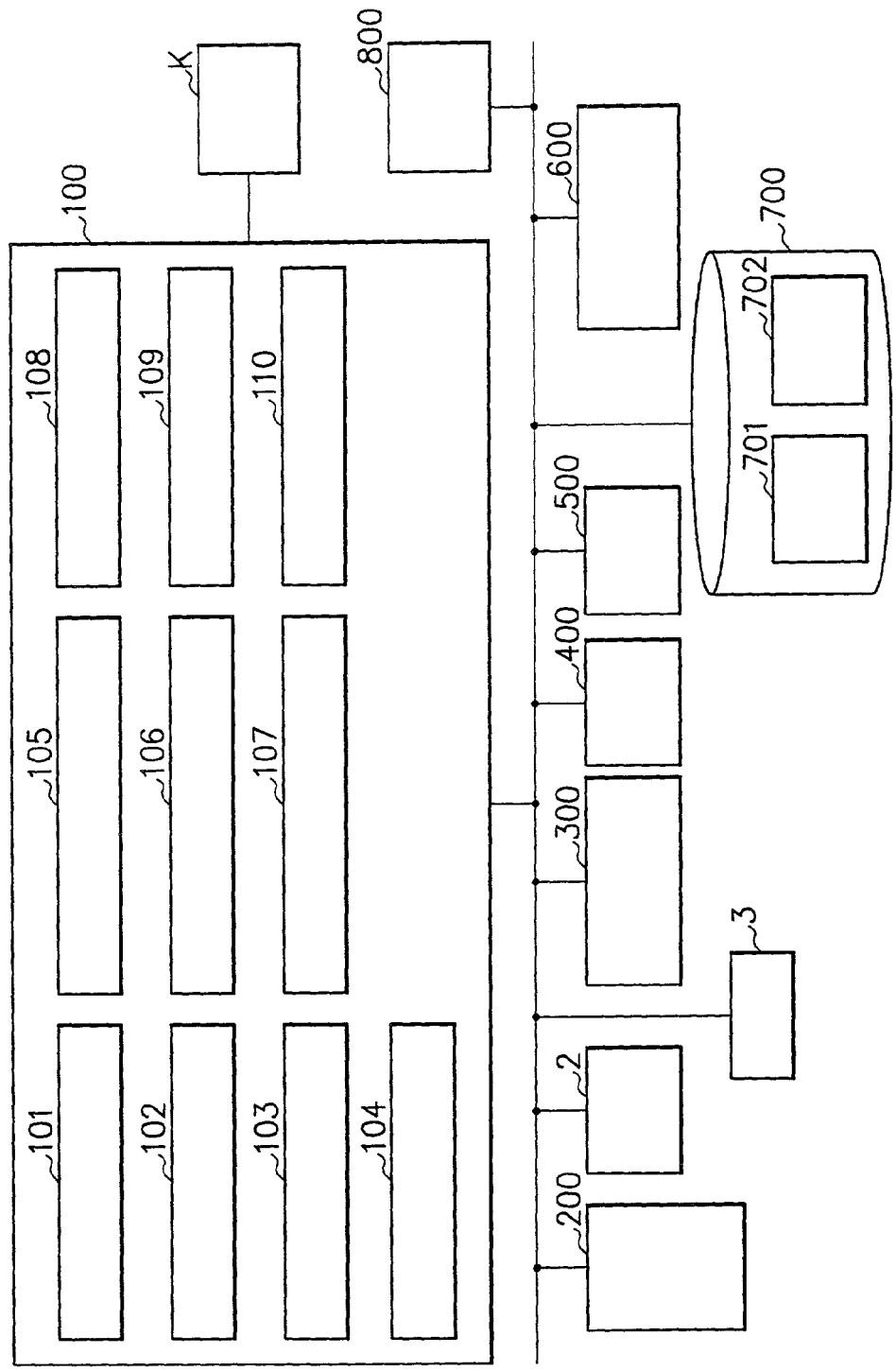
FIG. 2 is a block diagram showing an example of the internal structure of the ATM.

Referring now to the drawings, a description will be given in detail of preferred embodiments in accordance with the present invention.

FIG. 1 is a perspective view showing an appearance of an ATM having a driver's license authenticity checker of the present invention. As shown in FIG. 1, the ATM includes a driver's license insertion slot 1, an image camera (for shooting customer faces) 2, a light emitting diode(s) (LED) 3, a customer display 4, a menu display 5, a dual-panel display 6, a card insertion slot 7, a bankbook insertion slot 8, a paper money input pocket 9, and a coin input pocket 10.

A user inserts his/her driver's license into the driver's license insertion slot 1 when it is required to identify himself/herself with the driver's license, for example, on the occasion of opening a new bank account, etc. The image camera 2 shoots the facial portrait of the user when the LED 3, which is placed below the image camera 2, flashes. By looking at the LED 3, the direction of the user's face is adjusted for shooting.

The customer display 4 displays: a password, a ten-key for inputting the amount of money to deal with, guidance, or a menu indicating items of transaction, such as opening an account, deposit and withdrawal. The customer display 4 is provided with a touch panel having a transparent electrode on its surface. The menu display 5 displays items of transaction available at that time, such as deposit and money transfer. The dual-panel display 6 displays whether the ATM is "In Service" or "Out of Service".

A user inserts an ID card, such as a cash card, into the card insertion slot 7. Incidentally, a receipt showing an account history comes out of the card insertion slot 7 on completion of the transaction. A bankbook is inserted into the bankbook insertion slot 8, which puts out a new bankbook when a bankbook is issued.

A user inserts paper money in the paper money input pocket 9 and coins in the coin input pocket 10 when he/she deposits money. On the occasion of withdrawal, paper money and coins are paid into the paper money input pocket 9 and the coin input pocket 10 respectively.

FIG. 2 is a schematic diagram showing an example of internal structure of the ATM of FIG. 1. The ATM comprises a computer 100, a driver's license shooting section 200, a card/receipt processing means 300, a bankbook processing means 400, a money processing means 500, an operation panel 600, a memory(s) 700, and a communication device 800.

The computer 100 includes: a driver's license shooting controller 101 for controlling the driver's license shooting section 200; an image camera controller 102 for controlling the image camera 2; an authenticity judging section 103 for judging the authenticity of a driver's license based on an image data of its watermark shot by the driver's license shooting section 200; a face image collator 104 for identifying a user by collating the image data of his/her facial portrait shot by the image camera 2 with a photograph printed on a card that the user has inserted into the card insertion slot 7; a display controller 105 for controlling the display of the customer display 4, the menu display 5 and the dual-panel display 6; a card/receipt controller 106 for controlling the card/receipt processing means 300 to read the information such as a password recorded on the card and the image of the photograph on the card, and issue a receipt giving an account history; an operation panel maintenance section 107 for indicating the maintenance information on the operation panel 600 according to the operation of a maintainer; a bankbook controller 108 that controls the bankbook processing means 400 to print out an account history on the bankbook that has been inserted from the bankbook insertion slot 8; a money controller 109 for controlling the money processing means 500 to store the money inserted into the paper money input pocket 9 and the coin input pocket 10, and put out money to the paper money input pocket 9 and the coin input pocket 10; and a personal record maintenance section 110 for maintaining account histories of customers.

A recording medium K of the computer 100 is at least one selecting from a disk, a semiconductor memory or other recording media, storing a program for realizing the above function of the components 101 to 110 in the computer 100. Having read the program, the computer 100 is controlled, and thereby the function of the components 101 to 110 is to be realized.

In the memory 700, standard patterns of watermarks 701 and 702 of a driver's license, which are shot from the obverse and reverse side respectively, are registered.

Figure 3:
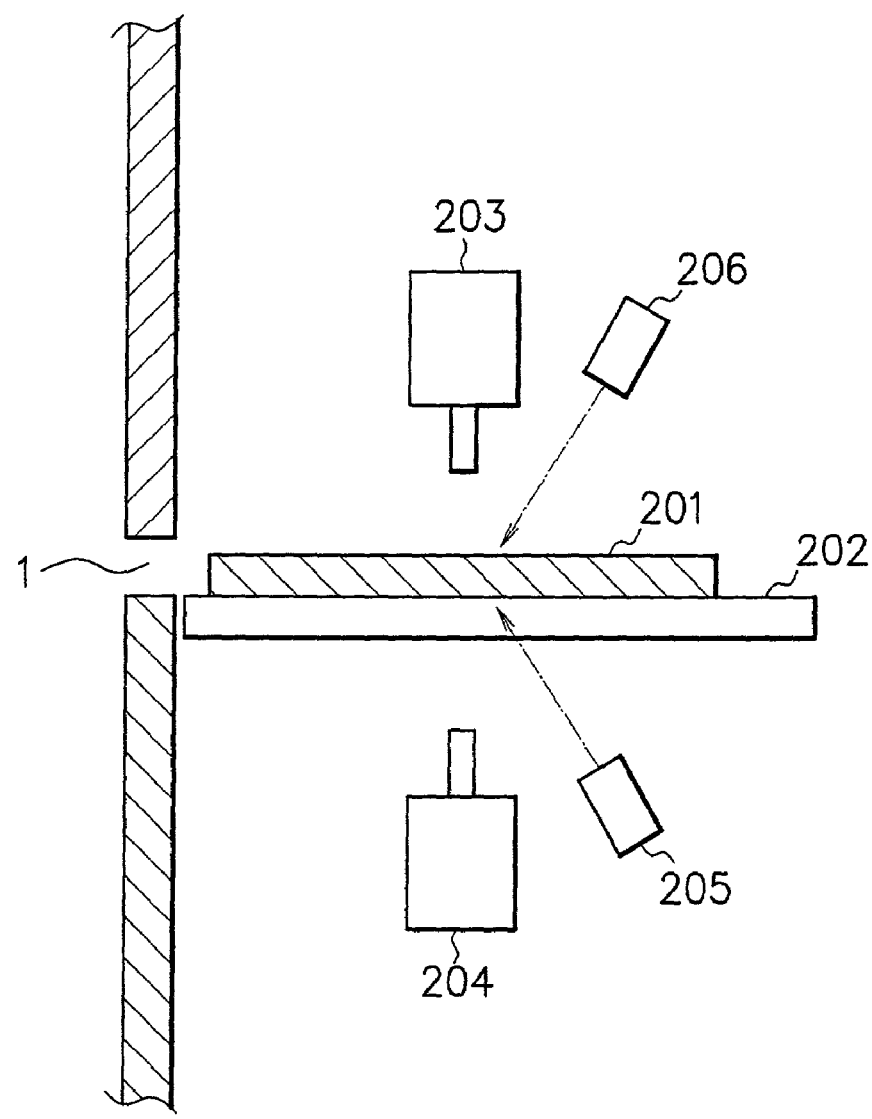
FIG. 3 is a diagram showing an example of the structure of a driver's license shooting section 200.

The driver's license shooting section 200 has constitution in which a watermark of a driver's license can be shot from both obverse and reverse side. FIG. 3 is a block diagram showing an example structure of the driver's license shooting section 200, including: a conveyor means 202 for carrying a driver's license 201 inserted from the driver's license insertion slot 1, the first camera 203 and the second camera 204 for shooting a watermark of the driver's license 201 from the obverse (upside) and the backside (downside), and the first light 205 and the second light 206 to irradiate the driver's license 201 from the reverse and obverse side. The conveyor 202 has the constitution wherein the driver's license 201 is held at its edges and carried so as not to hinder the cameras 203 and 204 in shooting the center part of the diver's license.

In the following, the operation according to an embodiment of the present invention will be described. First, the operation to open a new bank account, wherein it is required to identify oneself with his/her driver's license, will be explained.

Figure 4:
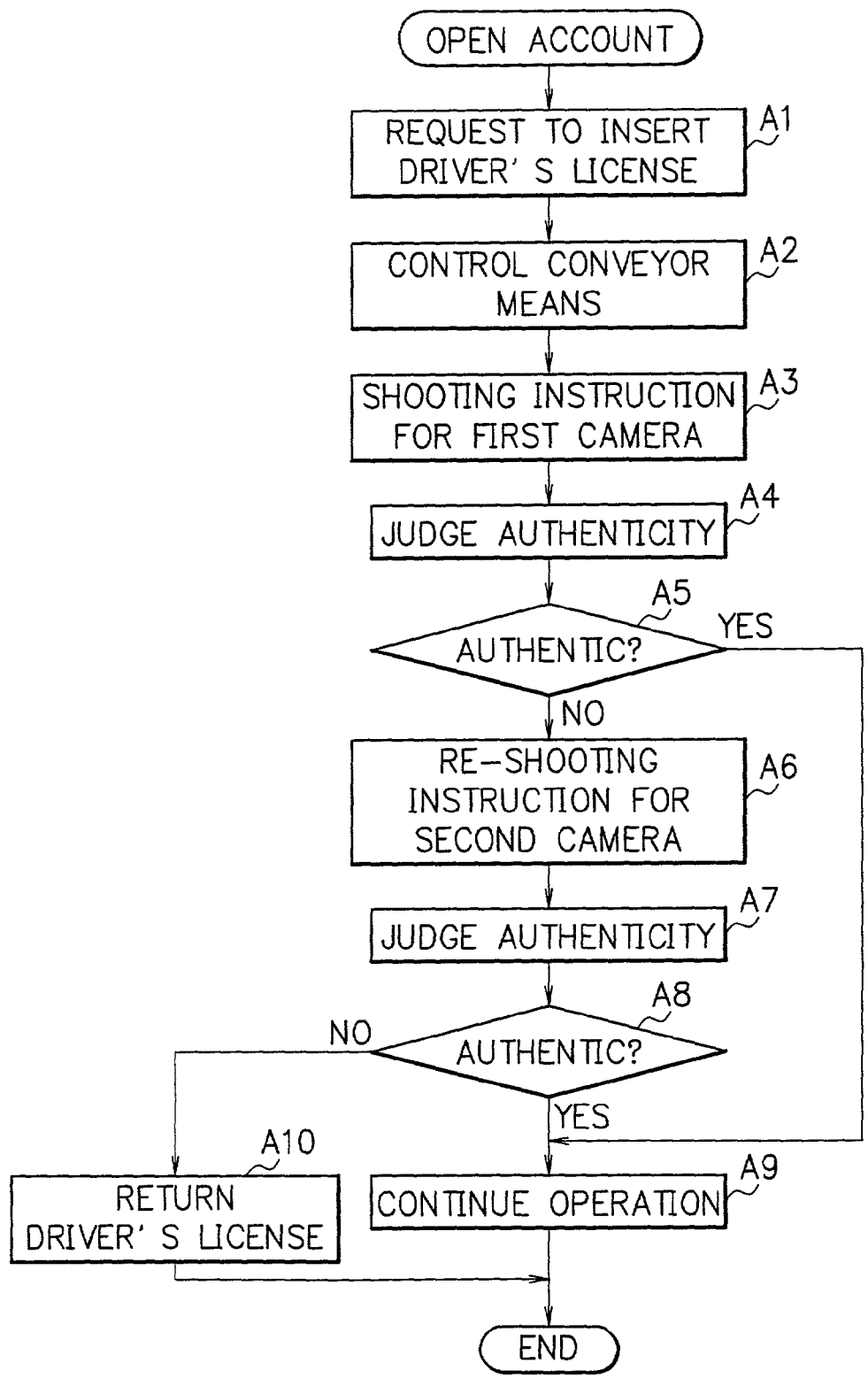
FIG. 4 is a flow chart showing an example of operation for opening a new bank account.

When a user chooses "Open an account" from the menu displayed on the customer display 4, the display controller 105 displays guidance "Please insert your driver's license face up" on the display (A1 in FIG. 4).

Following this guidance, the user inserts his/her driver's license 201 into the driver's license insertion slot 1. The driver's license shooting controller 101 detects the insertion of the driver's license 201 based on an output from a sensor (not shown), and controls the conveyor means 202 to carry the driver's license 201 to a fixed place where the first camera 203 and the second camera 204 can shoot the part of a watermark on the driver's license 201, which is not covered by printings and a photograph (A2).

After that, the driver's license shooting controller 101 outputs a shooting instruction to the driver's license shooting section 200 (A3). More concretely, the controller 101 instructs the first light 205 to turn on the light, the first camera 203 to shoot the license, and the first light 205 to turn off the light. Thereby the first light 205 irradiates the backside of the driver's license 201 and the first camera 203 shoots the watermark from the obverse side. And then the image data is supplied to the authenticity judging section 103. Incidentally, when the driver's license 201 is authentic, the image data of a watermark as shown in FIG. 5 can be obtained.

Receiving the image data of the watermark on the driver's license 201 shot from the obverse, the authenticity judging section 103 judges whether or not the watermark shown by the image data is authentic by collating the image with the standard pattern 701. The standard pattern 701 is a pattern of a watermark on a driver's license, which is shot from the obverse and registered in the memory 700. When the watermark is recognized as a regular watermark, the driver's license 201 is judged "authentic", and when not, it is judged "forgery" (A4).

When the driver's license 201 is judged authentic (YES, at A5), the computer 100 continues the operation to open a new account (A9). On the other hand, when it is judged "forgery" (NO, at A5), the driver's license image shooting controller 101 outputs a re-shooting instruction to the driver's license shooting section 200 (A6). More specifically, the driver's license shooting controller 101 instructs the second light 206 to turn on the light, the second camera 204 to shoot the license, and the second light 206 to turn off the light. Thereby the second camera 204 shoots the watermark from the backside as the second light 206 is irradiating the obverse. And then the image data is supplied to the authenticity judging section 103.

Receiving the image data of the driver's license 201 taken from the backside, the authenticity judging section 103 judges whether or not it is authentic by collating the image with the standard pattern 702. The standard pattern 702 is a pattern of a watermark on a driver's license, which is shot from the reverse side and registered in the memory 700. When the watermark is recognized as a regular watermark, the driver's license 201 is judged "authentic", and when not, it is judged "forgery" (A7).

In the case that the driver's license 201 is judged authentic (YES, at A8), the operation to open a new account is continued (A9). In the case that it is judged "forgery" (NO, at A8), the driver's license shooting controller 101 controls the conveyor means 202 to return the driver's license 201.

Figure 6:
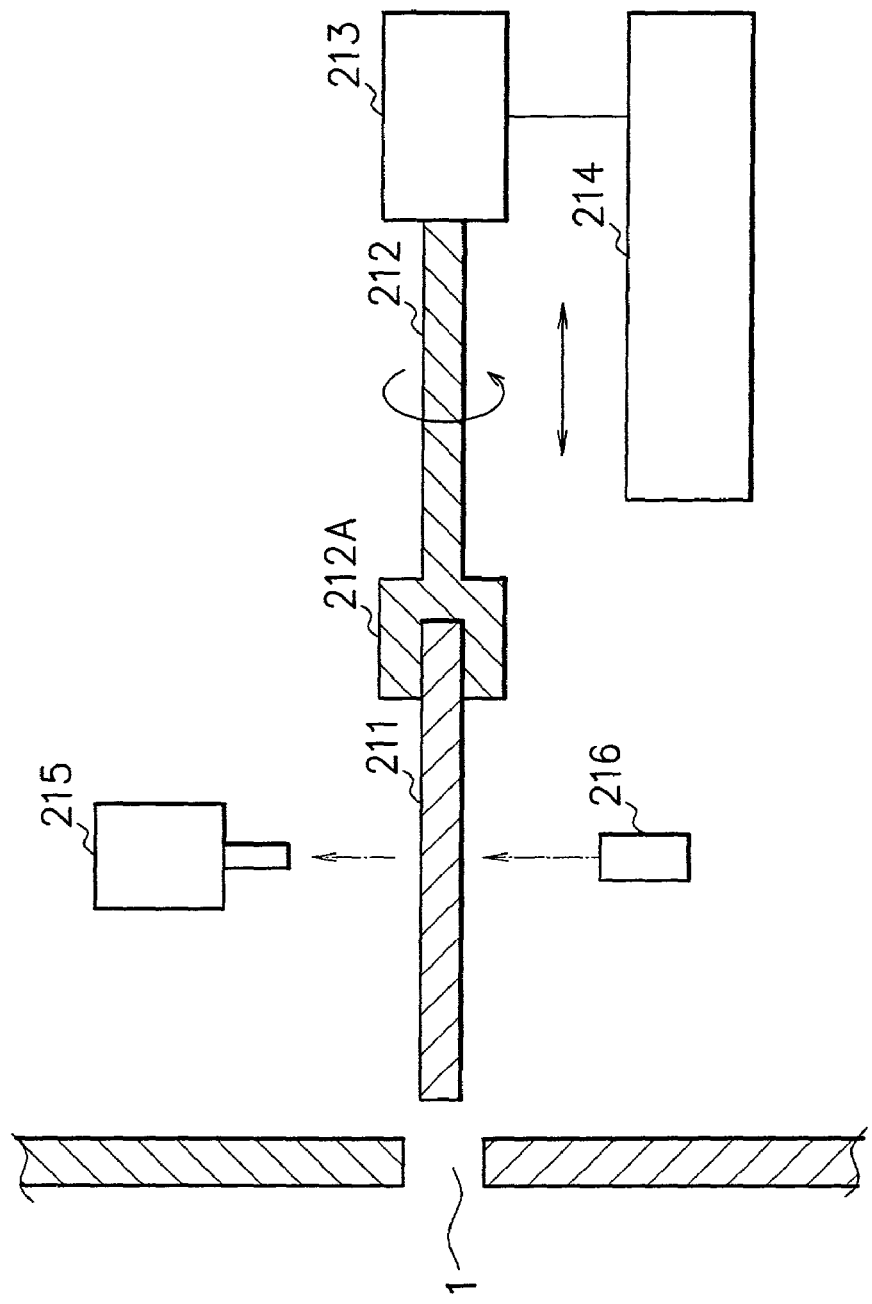
FIG. 6 is a diagram showing another example of the structure of a driver's license shooting section 200.

FIG. 6 is a schematic diagram showing another example of the constitution of the driver's license shooting section 200. In FIG. 6, the driver's license shooting section 200 comprises a pivot 212 having a holder 212a on its end to hold the driver's license 211 inserted through the driver's license insertion slot 1, a revolving means 213 to revolve the pivot 212, a conveyor means 214 to carry the driver's license 211 held by the holder 212a to the directions indicated by an arrow, a camera 215, and a light 216.

In the following, the operation of opening a new bank account according to this constitution will be explained.

When a user selects "Open an account" from the menu displayed on the customer display 4, the same process as the above-mentioned steps A1 and A2 in the flow chart of FIG. 4 is performed: the driver's license 211 inserted face up through the driver's license insertion slot 1 is carried to a fixed place, where the camera 215 can shoot the part of a watermark on the driver's license 211, which is not covered by printings and a photograph.

After that, the driver's license shooting controller 101 executes the following operation differently from the operation of the step A3. First, the controller 101 instructs the light 216 to turn on the light. Next, it instructs the camera 215 to shoot the driver's license 211, and finally instructs the light 216 to turn off the light. Subsequently, image of a watermark on the driver's license 211 shot from the obverse side is supplied to the authenticity judging section 103.

The authenticity judging section 103 judges whether the driver's license 211 is authentic or not (A4). When the driver's license is judged authentic (YES, at A5), the operation of the step A9 is performed. On the other hand, when it is judged forgery (NO, at A5), the driver's license shooting controller 101 executes the following operation instead of the operation of the step A6. The driver's license shooting controller 101 instructs the revolving means 213 to turn by 180 degrees, the light 216 to turn on the light, the camera 215 to shoot the driver's license, and then the light 216 to turn off the light. Thus the driver's license 211 turns by 180 degrees so that its reverse side, which has not face the lens of the camera 215, comes face to face with the lens. Thereby the camera 215 shoots the watermark from the reverse side, and the image data is supplied to the authenticity judging section 103. Then follows the operation of the steps A7 to A10.

FIG. 7 is a schematic diagram showing another example of the constitution of the driver's license shooting section 200. In FIG. 7, the driver's license shooting section 200 comprises a conveyor means 222 to carry a driver's license 221 inserted through the driver's license insertion slot 1, a camera 223, the first light 224 and the second light 225, mirrors 231 to 236, a movable mirror 230, and lenses 226 to 229. The angle of the movable mirror 230 can be switched so that its reflecting surface is at an angle of 45 degrees against the light axis of the lens of the camera 223 (indicated by a solid line), or 135 degrees against it (indicated by a broken line). Besides, the lens 231, the mirror 226, the lens 232, the mirror 227, the lens 233 and the movable mirror 230 form the first optical system where the light, which has been outputted from the first light 224 and penetrated through the driver's license 221, are propagated to the camera 223. In addition, the lens 234, the mirror 228, the lens 235, the mirror 229, the lens 236 and the movable mirror 230 form the second optical system where the light, which has been outputted from the second light 225 and penetrated through the driver's license 221, are propagated to the camera 223.

In the following, the operation for opening a new bank account according to this constitution will be explained.

When a user chooses "Open an account" from the menu displayed on the customer display 4, the same operation as the steps A1 and A2 in FIG. 4 is performed: the driver's license 221 inserted face up through the driver's license insertion slot 1 is carried to a fixed place where the camera 223 can shoot the part of a watermark on the driver's license 221, which is not covered by printings and a photograph.

After that, the driver's license shooting controller 101 executes the following operation instead of the operation of the step A3. First, the driver's license shooting controller 101 outputs a shooting instruction to the driver's license shooting section 200, in which it instructs the movable mirror 230 to switch its angle against the light axis to 45 degrees (indicated by a solid line), the first light 224 to turn on the light, the camera 223 to shoot the driver's license, and the light 224 to turn off the light. Thereby the first light 224 irradiates the back of the driver's license 221, and the first optical system including the lens 231 etc. propagates the light, which has penetrated the driver's license 221 from the back to the face side, to the camera 223. Thereby the camera 223 shoots a watermark of the driver's license 221 from the face side, and supplies the image data to the authenticity judging section 103.

The authenticity judging section 103 judges the authenticity of the driver's license 221 (A4). In the case that it is judged "authentic" (YES, at A5), the operation of the step A9 is performed. On the other hand, in the case that it is judged "forgery" (NO, at A5), the driver's license shooting controller 101 executes the following operation instead of the operation of the step A6. The driver's license shooting controller 101 outputs a re-shooting instruction to the driver's license shooting section 200, where it instructs the movable mirror 230 to switch its angle against the light axis to 135 degrees (indicated by a broken line), the second light 225 to turn on the light, the camera 223 to shoot the driver's license, and the second light 225 to turn off the light. Accordingly, the second light 225 irradiates the face of the driver's license 221, and the second optical system composed of the lens 234 etc. propagates the light, which has penetrated the driver's license 221 from the face side to the backside, to the camera 223. Thereby the camera 223 shoots a watermark of the driver's license 221 from the back, and supplies the image data to the authenticity judging section 103. Then follows the operation of the steps A7 to A10.

Next, the operation for transactions by a user who already has an account will be explained. Here, the operation of withdrawal will be explained as an example.

When a user selects "Withdrawal" from the menu displayed on the customer display 4, the display controller 105 indicates guidance "Please insert your card" on the display (FIG. 8, B1).

Following this guidance, the user inserts his/her card such as a cash card into the card insertion slot 7. On the card, information necessary for the transactions such as the user's ID number and the account number is magnetically recorded and a photograph of the user is printed.

When the card is inserted through the card insertion slot 7, the image scanner (not shown) provided to the card/receipt processing means 300 reads an image of the photograph on the card, and supplies the image data to the face image collator 104 (B2). After that, the card/receipt controller 106 sends the ID number read from the card by the card/receipt processing means 300 to the host computer (not shown) via the communication device 800, and requires the code number that corresponds to the ID number (B3). Receiving this request, the host computer supplies the code number corresponding to the ID number to the computer 100, which has made the request.

Subsequently, the face image shooting controller 102 turns on a light of the LED 3, and the display controller 105 displays guidance "Please look at the lamp" on the customer display 4 (B4). The face image shooting controller 102 orders the image camera 2 to shoot a facial portrait of the user at prescribed timing (B5). Thereby the image camera 2 photographs the user, and the image data are supplied to the face image collator 104.

The face image collator 104 identifies the user by collating the face image data from the image camera 2 with the image data of the photograph printed on the card, which has been obtained at the step B2 (B6). In the case that identity of the user cannot be proven (NO, at B7), the card is returned to the user (B11), and the withdrawal operation is terminated. In the case that identity of the user is proven (YES, at B7), the user is required to input his/her code number, which is to be compared with the code number obtained from the host computer (B8, B9). When both code numbers coincide with each other (YES, at B9), the withdrawal operation continues (B10). When they do not coincide with each other (NO, at B9), the operation of the step B11 is performed.

As is described above, in accordance with the embodiments of the present invention, it is made possible to prevent a person who has obtained a card and a code number thereof dishonestly from using it.

Incidentally, although a card, on which information necessary for transactions is magnetically recorded and a photograph of the owner is printed, is employed in the above description, it is also possible to use an IC card, on which face image data of the owner as well as information necessary for transactions are recorded. In the case of using such IC card, the face image data recorded on the IC card is collated with face image data shot by the image camera 2 to identify a user.

Moreover, in the ATM according to an embodiment of the present invention, a user, who already has a bank account and registered his/her face image data in the host computer, can receive a service without a card such as a cash card. In the following, the operation for withdrawal without using a card will be explained.

When a user selects "Withdrawal (without a card)" from the menu displayed on the customer display 4, the display controller 105 displays guidance "Please look at the lamp" on the display 4 together with the image camera controller 102 turns on a light of the LED3 (FIG. 9, C1). After that, the image camera controller 102 orders the image camera 2 to shoot a facial portrait of the user (C2). Thereby the image camera 2 shoots the facial portrait and supplies the image data to the image camera controller 102. The image camera controller 102 sends the image data from the image camera 2 to the host computer via the communication device 800 (C3).

In the host computer, face image data of customers, who wish for service without using a card, are registered with their ID numbers, account numbers, full names and addresses. Receiving the face image data of the user from the ATM, the host computer collates it with the pre-registered image data of the customers to find out coincidental one. When there is one coincidental image data, customer information registered with the image data is sent back to the computer 100. When there is no coincidental image data, the host computer responds to the computer 100 with "data not available". Besides, when there are plural coincidental image data, the host computer responds to the computer 100 with "multiple data correspond".

In the case of receiving the customer information (YES, at C4), the computer 100 continues the withdrawal operation by using the information (C5). On the other hand, in the case of receiving "data not available" (YES, at C6), it immediately terminates the operation. In addition, when the computer 100 is informed of "multiple data correspond" (NO, at C6), a message "Please insert your card" is displayed on the customer display 4 (C7). Following to the message, the user inserts his/her card into the card insertion slot 7, and thereby the usual withdrawal operation with a card is performed (C8). Incidentally, when a card is not inserted in the slot within the prescribed period after the indication of the message at the step C7, the operation for withdrawal is terminated.

As set forth hereinabove, the authenticity checker of a driver's license according to the present invention includes a driver's license shooting section capable of shooting a watermark of a driver's license from both obverse and reverse side.

Consequently, the authenticity of a driver's license can be automatically judged no matter whether it is the face-watermarked type or the back-watermarked type, since both watermarks shot from the face side and the backside may be used for the judgment. When at least one of them is recognized as a regular watermark, the driver's license is judged authentic.

Furthermore, an automated-teller machine provided with the driver's license authenticity checker of the present invention has an image camera for shooting the facial portrait of users. The image data of a user shot by the image camera is collated with an image of a photograph printed on an ID card, face image data recorded on an IC card used for identification purposes, or face image data of users registered in a server. Thus, it is possible to obtain higher security.

In the above embodiments, an automated-teller machine (ATM) is employed as an example to explain the present invention, however, this invention can also be applied to other machines such as a cash dispenser (CD).

While the present invention has been described with reference to the particular illustrative embodiments, it is not to be restricted by those embodiments but only by the appended claims. It is to be appreciated that those skilled in the art can change or modify the embodiment without departing from the scope and spirit of the present invention.

What is claimed is:

1. A method of authenticating a driver's license, the method comprising:
   gathering first driver's license imaging data based on a watermark on the obverse side of a driver's license, wherein the gathering of first driver's license imaging data further comprises irradiating the driver's license;
   determining if the watermark on the obverse side is regular based on the first driver's license imaging data;
   if the watermark on the obverse is determined not regular, gathering second driver's license imaging data based on a watermark on the reverse side of the driver's license, and determining if the watermark on the reverse side is regular based on the second driver's license imaging data, and wherein the gathering of first driver's license imaging data further comprises irradiating the driver's license;
   wherein, the driver's license is a forgery if the watermarks on the obverse and reverse sides are both deemed not regular, and the driver's license is authentic if either watermark on the obverse and reverse side is deemed regular.

2. A computer program product for enabling a computer to control the authentication of a driver's license, the computer program comprising:
   a computer readable medium; and
   software instructions on the computer readable medium adapted to enable the computer to perform operations of:
      gathering first driver's license imaging data based on a watermark on the obverse side of a driver's license, wherein the gathering of first driver's license imaging data further comprises irradiating the driver's license;
      determining if the watermark on the obverse side is regular based on the first driver's license imaging data;
      if the watermark on the obverse is determined not regular, gathering second driver's license imaging data based on a watermark on the reverse side of the driver's license, and determining if the watermark on the reverse side is regular based on the second driver's license imaging data, and wherein the gathering of first driver's license imaging data further comprises irradiating the driver's license;
   wherein, the driver's license is displayed as a forgery if the watermarks on the obverse and reverse sides are both deemed not regular, and the driver's license is displayed as authentic if either watermark on the obverse and reverse side is deemed regular.

* * * * *